(12) United States Patent
Johnson et al.

(10) Patent No.: US 10,204,240 B2
(45) Date of Patent: *Feb. 12, 2019

(54) ENCRYPTING PORTABLE MEDIA SYSTEM AND METHOD OF OPERATION THEREOF

(71) Applicant: ClevX, LLC, Kirkland, WA (US)

(72) Inventors: Simon B. Johnson, Bonney Lake, WA (US); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,876

(22) Filed: Aug. 8, 2017

(65) Prior Publication Data

US 2017/0357832 A1    Dec. 14, 2017

Related U.S. Application Data

(63) Continuation of application No. 12/826,646, filed on Jun. 29, 2010, now Pat. No. 9,734,356.

(60) Provisional application No. 61/221,374, filed on Jun. 29, 2009.

(51) Int. Cl.
*H04L 29/06* (2006.01)
*G06F 21/79* (2013.01)
*G06F 12/14* (2006.01)

(52) U.S. Cl.
CPC .......... *G06F 21/79* (2013.01); *G06F 12/1408* (2013.01)

(58) Field of Classification Search
CPC ............................ G06F 21/79; G06F 12/1408
See application file for complete search history.

(56) References Cited

U.S. PATENT DOCUMENTS

| 7,069,447 | B1 | 6/2006 | Corder |
| 7,136,995 | B1 * | 11/2006 | Wann .................. G06Q 20/382 380/42 |
| 7,631,195 | B1 * | 12/2009 | Yu .......................... G06F 21/72 713/179 |
| 8,745,409 | B2 | 6/2014 | Teicher et al. |
| 8,832,440 | B2 | 9/2014 | Johnson et al. |
| 9,075,571 | B2 | 7/2015 | Bolotin et al. |
| 9,262,611 | B2 | 2/2016 | Johnson et al. |
| 9,734,356 | B2 | 8/2017 | Johnson et al. |
| 2002/0095382 | A1 | 7/2002 | Taoka et al. |

(Continued)

FOREIGN PATENT DOCUMENTS

WO    WO-2009042820 A2    4/2009

OTHER PUBLICATIONS

"U.S. Appl. No. 12/826,646, Advisory Action dated Feb. 22, 2013", 3 pgs.

(Continued)

*Primary Examiner* — Brandon S Hoffman
*Assistant Examiner* — William A Corum, Jr.
(74) *Attorney, Agent, or Firm* — Schwegman Lundberg & Woessner, P.A.

(57) ABSTRACT

A portable media system for a host computer system, and method of operation thereof, that includes: a controller in the portable media system for communicating clear information between the portable media system and the host computer system; and an encryption system in the portable media system for providing an encryption algorithm for the controller to decrypt cipher information for the host computer system.

19 Claims, 4 Drawing Sheets

(56) References Cited

U.S. PATENT DOCUMENTS

| | | | |
|---|---|---|---|
| 2002/0188856 A1 | 12/2002 | Worby et al. | |
| 2003/0115447 A1* | 6/2003 | Pham | H04L 63/0428 713/153 |
| 2003/0221103 A1 | 11/2003 | Hirota et al. | |
| 2006/0105748 A1 | 5/2006 | Ooi et al. | |
| 2006/0289659 A1 | 12/2006 | Mizushima | |
| 2007/0204171 A1* | 8/2007 | Ito | G06F 21/80 713/193 |
| 2008/0022099 A1 | 1/2008 | Kawano et al. | |
| 2008/0065905 A1 | 3/2008 | Salessi | |
| 2008/0240434 A1* | 10/2008 | Kitamura | G06F 21/80 380/255 |
| 2009/0055573 A1* | 2/2009 | Ito | G06F 3/0622 711/102 |
| 2009/0164789 A1 | 6/2009 | Carvounas et al. | |
| 2009/0313397 A1 | 12/2009 | England et al. | |
| 2010/0153708 A1 | 6/2010 | Malka | |
| 2010/0246827 A1 | 9/2010 | Lauter et al. | |
| 2010/0287373 A1 | 11/2010 | Johnson et al. | |
| 2010/0332847 A1 | 12/2010 | Johnson et al. | |
| 2011/0060921 A1 | 3/2011 | Michael | |
| 2012/0096284 A1 | 4/2012 | Matsukawa et al. | |
| 2016/0119339 A1 | 4/2016 | Bolotin et al. | |
| 2016/0259736 A1 | 9/2016 | Bolotin et al. | |

OTHER PUBLICATIONS

"U.S. Appl. No. 12/826,646, Advisory Action dated Aug. 11, 2016", 3 pgs.

"U.S. Appl. No. 12/826,646, Advisory Action dated Oct. 19, 2015", 3 pgs.

"U.S. Appl. No. 12/826,646, Final Office Action dated Mar. 17, 2017", 18 pgs.

"U.S. Appl. No. 12/826,646, Final Office Action dated May 13, 2016", 17 pgs.

"U.S. Appl. No. 12/826,646, Final Office Action dated Aug. 5, 2015", 14 pgs.

"U.S. Appl. No. 12/826,646, Final Office Action dated Nov. 20, 2012", 12 pgs.

"U.S. Appl. No. 12/826,646, Non Final Office Action dated Feb. 10, 2016", 17 pgs.

"U.S. Appl. No. 12/826,646, Non Final Office Action dated Apr. 17, 2015", 13 pgs.

"U.S. Appl. No. 12/826,646, Non Final Office Action dated Jun. 27, 2012", 12 pgs.

"U.S. Appl. No. 12/826,646, Non Final Office Action dated Nov. 16, 2016", 17 pgs.

"U.S. Appl. No. 12/826,646, Notice of Allowance dated Jun. 6, 2017", 6 pgs.

"U.S. Appl. No. 12/826,646, Response filed Jan. 25, 2013 to Final Office Action dated Nov. 20, 2012", 5 pgs.

"U.S. Appl. No. 12/826,646, Response filed Feb. 16, 2017 to Non Final Office Action dated Nov. 16, 2016", 11 pgs.

"U.S. Appl. No. 12/826,646, Response filed Apr. 28, 2016 to Non Final Office Action dated Feb. 10, 2016", 13 pgs.

"U.S. Appl. No. 12/826,646, Response filed May 17, 2017 to Final Office Action dated Mar. 17, 2017", 13 pgs.

"U.S. Appl. No. 12/826,646, Response filed Jul. 17, 2015 to Non Final Office Action dated Apr. 17, 2015", 11 pgs.

"U.S. Appl. No. 12/826,646, Response filed Aug. 2, 2016 to Final Office Action dated May 13, 2016", 13 pgs.

"U.S. Appl. No. 12/826,646, Response filed Sep. 11, 2014 to Advisory Action dated Feb. 22, 2013", 15 pgs.

"U.S. Appl. No. 12/826,646, Response filed Sep. 30, 2016 to Advisory Action dated Aug. 11, 2016", 13 pgs.

"U.S. Appl. No. 12/826,646, Response filed Oct. 2, 2015 to Final Office Action dated Aug. 5, 2015", 14 pgs.

"U.S. Appl. No. 12/826,646, Response filed Oct. 29, 2012 to Non Final Office Action dated Jun. 27, 2012", 19 pgs.

"U.S. Appl. No. 12/826,646, Revised Response filed May 25, 2017 to Final Office Action dated Mar. 17, 2017", 14 pgs.

Johnson, et al., "U.S. Appl. No. 12/652,035, filed Jan. 4, 2010".

Johnson, et al., "U.S. Appl. No. 12/684,108, filed Jan. 7, 2010".

* cited by examiner

ENCRYPTING PORTABLE MEDIA SYSTEM AND METHOD OF OPERATION THEREOF

CLAIM OF PRIORITY

This application is a Continuation Application under 35 USC § 120 of U.S. patent application Ser. No. 12/826,646, entitled "Encrypting Portable Media System and Method of Operation Thereof," filed on Jun. 29, 2010, which claims priority from U.S. Provisional Patent Application No. 61/221,374, filed Jun. 29, 2009, and entitled "Encrypting Mass Storage System and Method of Operation Thereof," all of which are incorporated herein by reference in their entirety.

TECHNICAL FIELD

The present invention relates generally to portable memory systems with encryption algorithms, and more particularly, to such systems supporting encryption functions for host computer systems.

BACKGROUND

With the increasing capacity of small portable media (e.g. Flash drives) comes the increasing danger of losing confidential information. The increasing capacity of portable media facilitates their use as viable storage in institutions that may possess large amounts of confidential information. A lost Flash drive is a common problem. It is not the cost of replacement that is the issue, it is the leakage of confidential information and susceptibility to litigation and fines.

In an effort to protect confidential information, many vendors of mass storage media include algorithms for encrypting information as it is stored internally. In the event the drive is lost, confidential information remains inaccessible due to its obfuscation. Corporate and government organizations sensitive to confidentiality issues have to rely on policies that advocate the use of encrypted drives. Many companies restrict use of removable storage by policy to keep sensitive information from being disclosed unintentionally. Some go as far as to block physical access to USB ports.

Currently, computers have no way to verify that attached external storage supports an appropriate level of encryption. Thus, there is a serious problem with a host computer system being able to distinguish between a mass storage equipped with encryption algorithms and a drive that simply stores information as clear text. A host computer system could simply query the portable media system as to its capabilities but the host computer system could easily be 'spoofed.' This is because the internal encryption algorithm in a portable media system is not accessible to a host computer system either directly or indirectly. A host computer always exchanges information with encrypted media in clear information form, which is identical to an information exchange with unencrypted media.

Solutions to these problems have been long sought but prior developments have not taught or suggested any solutions and, thus, solutions to these problems have long eluded those skilled in the art.

DISCLOSURE OF THE INVENTION

The present invention provides a portable media system for a host computer system, and method of operation thereof, that includes: a controller in the portable media system for communicating clear information between the portable media system and the host computer system; and an encryption system in the portable media system for providing an encryption algorithm for the controller to decrypt cipher information for the host computer system.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
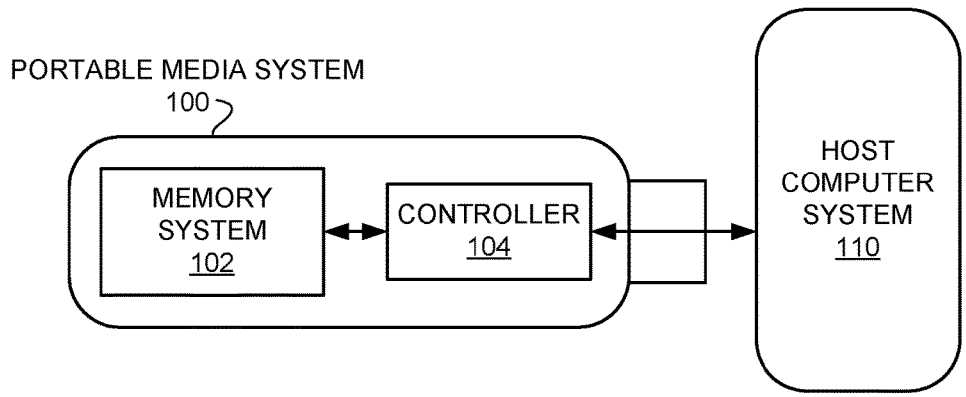
FIG. 1 shows the connection of a portable media system with a host computer system in accordance with an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing Figures Similarly, although the views in the drawings for ease of description generally show similar orientations, this depiction in the Figures is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "host computer system" as used herein includes computing devices, such as computers, production machines with embedded computers, smart phones, and other processor-equipped devices.

The term "portable media system" means a hand-held device containing solid-state, optical disk, or hard disk memory storage. The term "portable" means that a device is capable of being easily held in one hand like a Flash memory device or portable hard disk drive.

The term "cipher information" means information or data that has been encrypted and the term "clear information" means information or data that is essentially free of encryption.

Referring now to FIG. 1, therein is shown the connection of a portable media system 100 with a host computer system 110 in an embodiment of the current invention.

The portable media system 100 has an internal memory system 102. The memory system 102 can be a non-volatile or volatile memory including solid-state, optical disk, hard disk, or other information storage systems.

The memory system 102 is connected to an internal controller 104 which acts as the interface for communication of information between the memory system 102 and the host computer system 110.

The portable media system 100 is shown, as an example, as a NAND Flash memory chip having a USB (Universal Serial Bus) connector at one end. When connected by the USB connector to the host computer system 110, the portable media system 100 appears as just another attached drive with a unique drive letter assigned by the host computer system 110.

Figure 2:
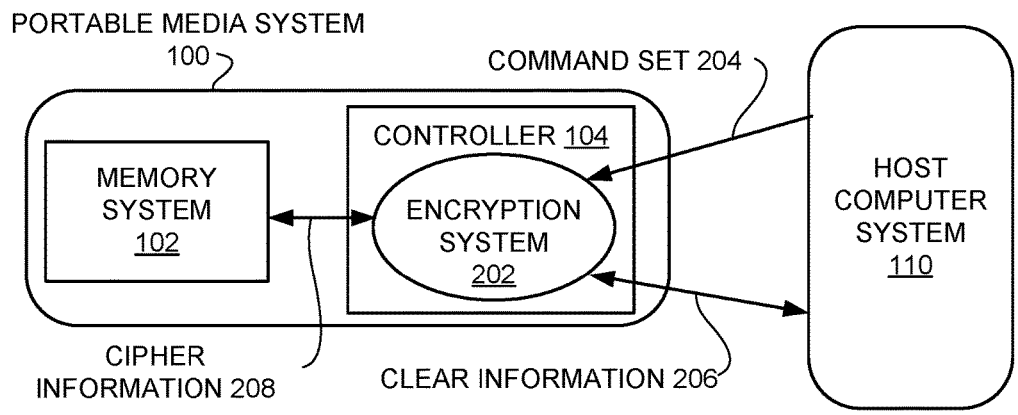
FIG. 2 shows a schematic of how information flows between the host computer system and the portable media system in FIG. 1.

Referring now to FIG. 2, therein is shown a schematic of how information flows between the host computer system 110 and the portable media system 100 in FIG. 1.

The portable media system 100 contains an internal encryption system 202 that the controller 104 uses to encrypt and decrypt information. The internal encryption system 202 can be a software implemented encryption algorithm in the controller 104 or a hardware implemented encryption algorithm in an application specific integrated circuit (ASIC).

In the portable media system 100 of the present embodiment, the encryption system 202 in the controller 104 is a software implemented encryption algorithm.

The host computer system 110 sends commands in a command set 204 to the portable media system 100. For example, as part of the packet exchange defined for Flash memory devices and USB 2.0 standards, all USB storage devices must support a SCSI (Small Computer Systems Interface) communication protocol in order to exchange data. This is the standard for all mass storage class devices connected to a computer. In addition, a USB mass storage device must support requests for information regarding the management of the device commonly referred to as descriptors, which include such things as VID (vendor ID), PID (product ID), etc. Responses to commands/requests are currently returned in a clear data form.

The controller 104 takes clear information 206 from the host computer system 110 and encrypts the clear information 206 to provide it as cipher information 208 to the memory system 102.

Likewise, cipher information 208 from the memory system 102 is converted by the encryption system 202 and the controller 104 before it is sent as clear information 206 to the host computer system 110.

In the present embodiment, the host computer system 110 is not permitted direct access to the cipher information 208. Only the clear information 206 is transmitted between the host computer system 110 and the controller 104.

Figure 3:
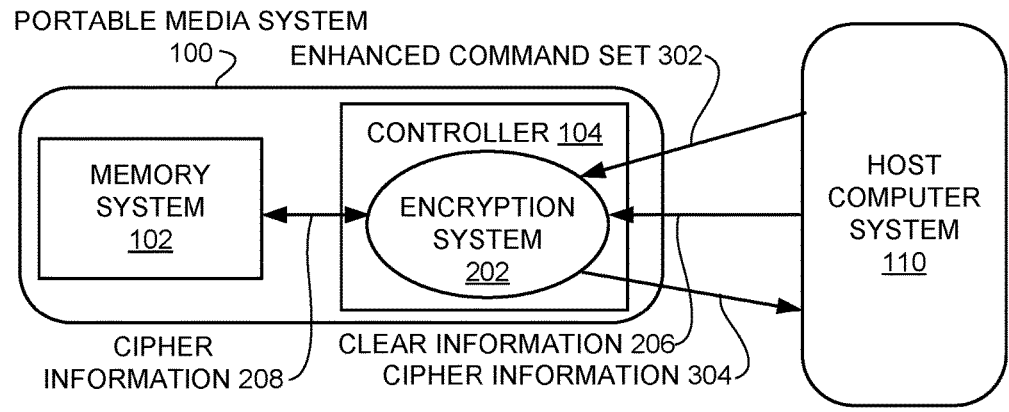
FIG. 3 shows a schematic of how information flows between the portable media system and the host computer system in accordance with another embodiment of the present invention.

Referring now to FIG. 3, therein is shown a schematic of how information flows between the portable media system 100 and the host computer system 110 in accordance with another embodiment of the present invention.

Commands in an enhanced command set 302 permit the exchange of cipher information 304, the cipher information 304 passing through the encryption system 202, and the clear information 206 with the host computer system 110. For example, the SCSI "Read" command can be extended with an attribute to indicate whether decryption is to be performed on data being accessed. With the attribute "clear" (to be backwardly compatible with non-encrypting media), the controller 104 would decrypt the cipher information 208 prior to returning the clear information 206 to the host computer system 110. With the attribute "set", the controller 104 would not decrypt the cipher information 208 and return it as the cipher information 304 to the host computer system 110.

Thus, the host computer system 110 is able to supply the clear information 206 and read back its equivalent cipher information 304. The cipher information 304 is the same as the cipher information 208 stored in the memory system 102.

Figure 4:
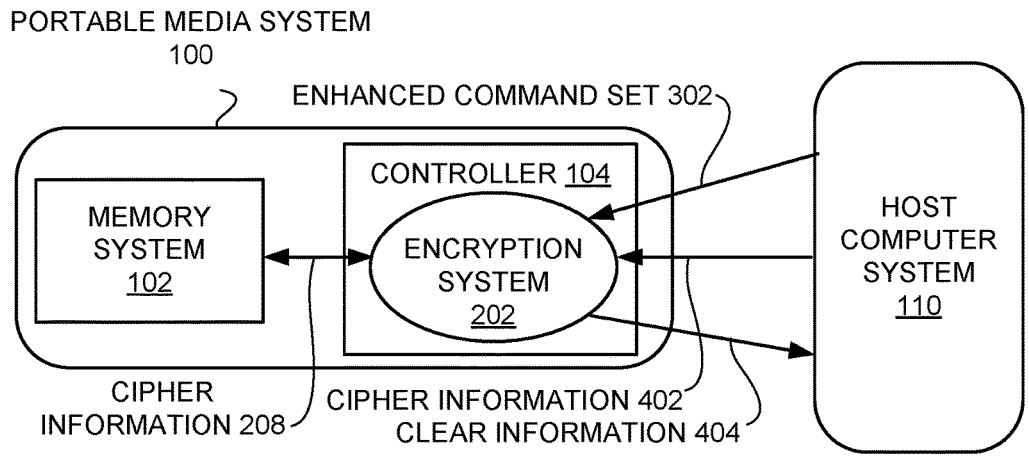
FIG. 4 shows a schematic of how information flows between the host computer system 110 and the portable media system 100 in accordance with another embodiment of the present invention.

Referring now to FIG. 4, therein is shown how information flows between the host computer system 110 and the portable media system 100 in accordance with another embodiment of the present invention. Clear information 404 can be sent from the encryption system 202 to the host computer system 110. Commands in the enhanced command set 302 and cipher information 402 from the host computer system 110 are provided to the controller 104 in the portable media system 100.

The enhanced command set 302 could be enhanced above the enhanced command set 204 of FIG. 2. For example, the SCSI "Write" command could be extended to indicate whether encryption is to be performed on data being written to the memory system 102. With the attribute "set", the controller 104 would not encrypt the cipher information 402 and write the cipher information 402, as-is, to the memory system 102.

When used in conjunction with the portable media system 100 of the embodiment of FIG. 3, the portable media system 100 of the embodiment of FIG. 4 allows storage and use of the cipher information 304 of FIG. 3 and the cipher information 402 by the host computer system 110.

Figure 5:
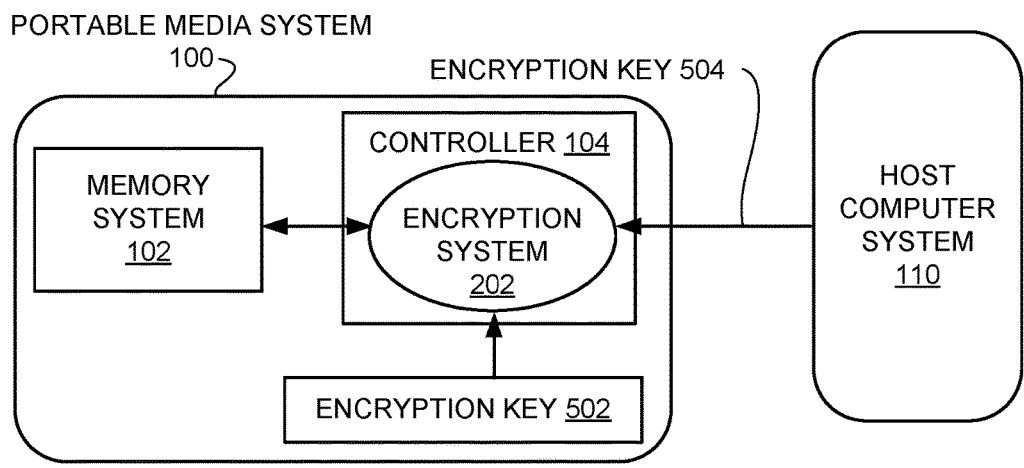
FIG. 5 shows a schematic of encryption keys that may be used in accordance with another embodiment of the present invention.

Referring now to FIG. 5, therein are shown a schematic of encryption keys that may be used in accordance with another embodiment of the present invention. An internal encryption key 502 may be internal to the portable media system 100 or insertable into the portable media system 100.

An external encryption key 504 can be stored in the host computer system 110 and be delivered to the portable media system 100 when communication is established. The encryption keys are used to encrypt/decrypt information by the encryption system 202.

The internal encryption key 502 may be the preferred method for providing the encryption key because it means that the encryption key cannot be seen by the host computer system 110 and, therefore, is not susceptible to computer-side hacking.

The external encryption key 504 can be used to validate or confirm operability of the attached portable media system 100 to the host computer system 110.

In various embodiments, the portable media system 100 can provide encryption or decryption of information from and to the host computer system 110. The information can be stored internally in the portable media system 100, or the portable media system 100 can provide for storage of encrypted information away from the host computer system 110.

Figure 6:
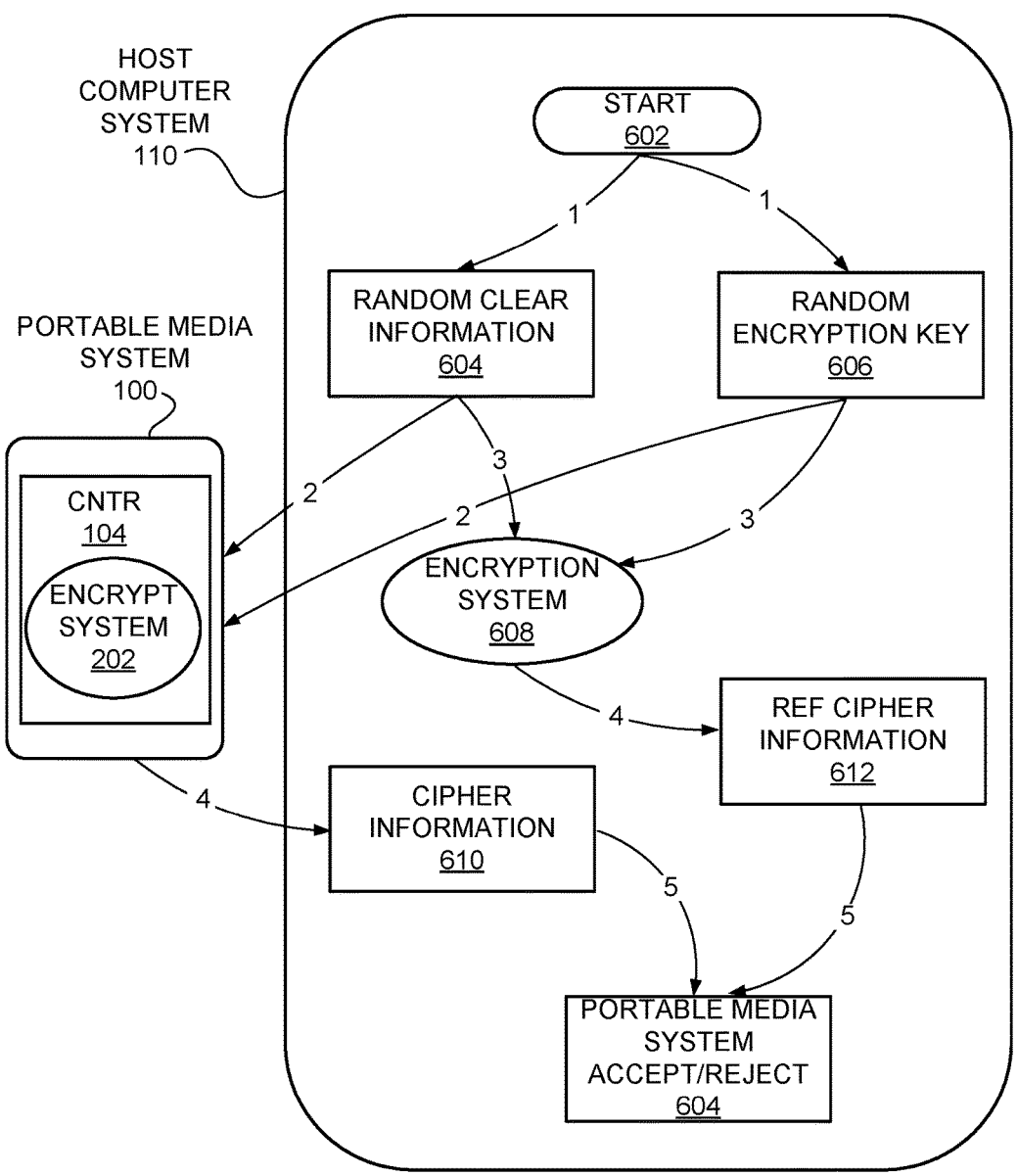
FIG. 6 shows a schematic of how the host computer system can verify compatibility of a portable media system in accordance with another embodiment of the present invention.

Referring now to FIG. 6, therein is shown a schematic of a method of how the host computer system 110 can verify compatibility of a portable media system 600 in accordance with another embodiment of the present invention.

The memory system 102 of FIG. 1 is not used or required for the verification method.

The method starts in a block 602 in the host computer system 110 and in a step 1 creates random clear information in a block 604 and a random encryption key in a block 606.

In a step 2, the random clear information and the random encryption key are sent to the portable media system 100 where the controller 104 uses the random encryption key and the encryption system 202 to encrypt the random clear information.

In a step 3, which may be contemporaneous with step 2, the random clear information from the block 604 and the random encryption key from the block 606 are sent to an encryption system 608 in the host computer system 110. The host computer system 110 uses the random encryption key and the encryption system 608 to encrypt the random clear information.

In a step 4, the host computer system 110 reads the cipher information from the encryption system 202 into a cipher information block 610 and from the encryption system 608 into a reference cipher information block 612.

In a step 5, the cipher information from block 610 and the reference cipher information from block 612 are compared and the portable media system 100 is validated or not based on whether the comparison indicates there is a match or not.

However, it has been discovered that the capability of performing encryption in the host computer system as well as in the portable media system and comparing the results allows for the host computer system to verify whether the portable media system supports encryption or does not support encryption.

The above is a function of allowing the host computer system to supply the portable media system with an information sample and an encryption key. The portable media system would then execute its internal encryption algorithm on sample information using the encryption key and returning the results to the host computer system for verification. The host computer system can there compare the result to the internally encrypted sample information.

Once the host computer system determines that the result information and the internal encrypted information are the same, the host computer system is then able to obtain access to an encryption bearing portable media system while denying access to unencrypted or improperly encrypted portable media systems.

Figure 7:
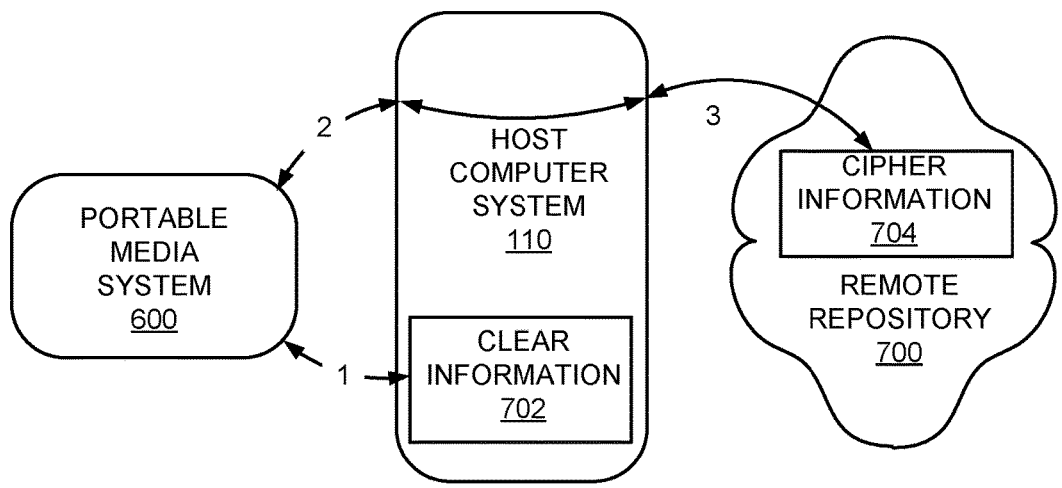
FIG. 7 shows a schematic of how the portable media system may be used to store cipher information at a remote repository in accordance with another embodiment of the present invention.

Referring now to FIG. 7, therein is shown a schematic of how the portable media system 600 may be used to store cipher information at a remote repository 700 in accordance with another embodiment of the present invention. The remote repository 700 can be a data storage bank in a cloud computing system. Cloud computing is Internet based computing where shared resources, software, and information would be provided to the host computer system 110 as though they're a part of a single unitary system.

Cloud computing is a paradigm shift similar to the paradigm shift from mainframes to client server systems. Details of requirements are extracted from the users who no longer have a need for expertise or control over the technology infrastructure "in the cloud" that supports them. Typically, cloud computing involves over-the-Internet provision of dynamically scalable and often virtualized resources. The term "cloud" is used as a metaphor for the Internet, based on the cloud schematic of the remote repository 700.

Clear information 702 is provided in the host computer system 110 and in a step 1 is provided to the portable media system 600 where the clear information 702 is encrypted and provided in a step 2 back to the host computer system 110. The host computer system 110 is connected in a step 3 to the Internet which contains the remote repository 700 in which cipher information 704 may be stored.

The portable media system 600 minimizes the chances of computer hacking because encryption/decryption is performed away from the host computer system 110 and the remote repository 700.

As would be evident, the host computer system 110 can instruct the cipher information 704 to be returned to the host computer system 110 for transfer to the portable media system 600 for decryption and provision of the clear information 702 back to the host computer system 110.

Figure 8:
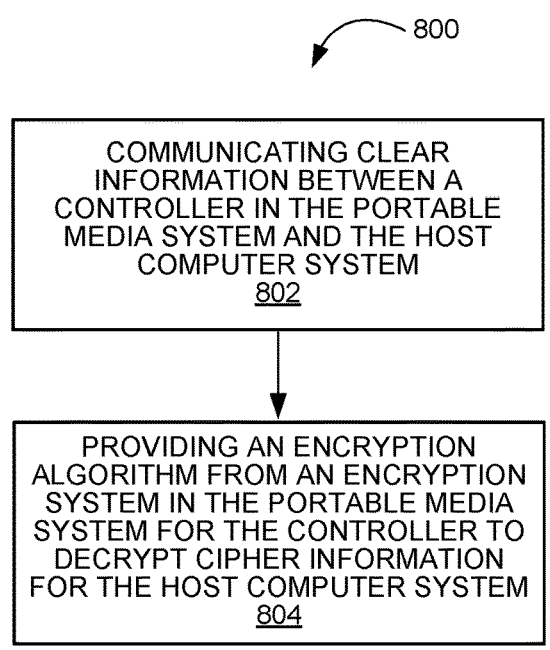
FIG. 8 shows a method of operation of a portable media system for a host computer system 110 in accordance with another embodiment of the present invention.

Referring now to FIG. 8, therein is shown a method 800 of operation of a portable media system 100 for a host computer system 110. The method 800 includes: communicating clear information between a controller in the portable media system and the host computer system; and providing an encryption algorithm from an encryption system in the portable media system for the controller to decrypt cipher information for the host computer system.

While there are many Flash memory device suppliers who declare that their products support encryption, there is no way for a user to verify this because the host computer system has no way of checking for encryption in a connected device.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method comprising:
   generating an encryption key inside of a portable media system that is configured to store cipher information, the portable media system being configured to receive the cipher information from a host computer system and the portable media system being configured to generate the cipher information with the encryption key when the host computer system transmits clear information;
   storing the encryption key inside the portable media system, wherein the encryption key is not visible to the host computer system;

receiving, by the portable media system, a command including an attribute indicating a selection of the clear information or the cipher information to be transmitted to the host computer system;

transmitting, after decrypting the cipher information by the portable media system, from the portable media system to the host computer system, the clear information when the attribute indicates that the clear information is to be transmitted to the host computer system; and transmitting the cipher information, previously encrypted by the portable media system, from the portable media system to the host computer system when the attribute indicates that the cipher information is to be transmitted.

2. The method as recited in claim 1, further comprising:
decrypting the cipher information, stored in the portable media system, with the encryption key stored inside of the portable media system before transmittal of the clear information from the portable media system to the host computer system.

3. The method as recited in claim 1, further comprising:
storing the cipher information in a memory system in the portable media system, the memory system being connected to a controller in the portable media system; and
providing an encryption system, in the portable media system, having an encryption algorithm for encrypting the clear information with the encryption key stored inside the portable media system.

4. The method as recited in claim 3, wherein the controller is for generating and storing the encryption key for use by the encryption system to encrypt or to decrypt data.

5. The method as recited in claim 1, wherein generating the encryption key further comprises:
generating the encryption key at random.

6. The method as recited in claim 1, wherein the command is part of an enhanced command set for exchanging information between the portable media system and the host computer system, wherein the command permits exchanging the cipher information and the clear information between the portable media system and the host computer system.

7. The method as recited in claim 6, wherein the enhanced command set includes a first command for a Small Computer System Interface (SCSI) read, the first command including the attribute indicating the selection of the clear information or the cipher information.

8. The method as recited in claim 6, wherein the enhanced command set includes a second command for a SCSI write, the second command including another attribute indicating whether encryption is to be performed on data being written to the portable media system.

9. A portable media system comprising:
a memory for storing cipher information; and
a controller configured to generate and store an encryption key; and
an encryption system for generating the cipher information when a host computer system transmits clear information, the cipher information being generated by encrypting the clear information with the encryption key, the encryption system further configured for decrypting the cipher information with the encryption key to generate the clear information;
wherein the controller is further configured to:
receive a command including an attribute indicating a selection of the clear information or the cipher information to be transmitted to the host computer system;
transmit, after decrypting the cipher information by the portable media system, to the host computer system, the clear information when the attribute indicates that the clear information is to be transmitted to the host computer system; and
transmit, to the host computer system, the cipher information, previously encrypted by the portable media system, when the attribute indicates that the cipher information is to be transmitted.

10. The portable media system as recited in claim 9, wherein the encryption system includes an encryption algorithm for encrypting the clear information with the encryption key stored inside the portable media system.

11. The portable media system as recited in claim 9, wherein the controller contains the encryption key for use by the encryption system to encrypt or to decrypt data.

12. The portable media system as recited in claim 9, wherein the encryption key is a random key created inside the portable media system.

13. The portable media system as recited in claim 9, wherein the command is part of an enhanced command set for exchanging information between the portable media system and the host computer system, wherein the command permits exchanging the cipher information and the clear information between the portable media system and the host computer system.

14. The portable media system as recited in claim 13, wherein the enhanced command set includes a first command for a Small Computer System Interface (SCSI) read, the first command including the attribute indicating the selection of the clear information or the cipher information.

15. The portable media system as recited in claim 13, wherein the enhanced command set includes a second command for a SCSI write, the second command including another attribute indicating whether encryption is to be performed on data being written to the portable media system.

16. A non-transitory machine-readable storage medium including instructions that, when executed by a machine, cause the machine to perform operations comprising:
generating an encryption key inside of a portable media system that is configured to store cipher information, the portable media system being configured to receive the cipher information from a host computer system and the portable media system being configured to generate the cipher information with the encryption key when the host computer system transmits clear information;
storing the encryption key inside the portable media system, wherein the encryption key is not visible to the host computer system;
receiving, by the portable media system, a command including an attribute indicating a selection of the clear information or the cipher information to be transmitted to the host computer system;
transmitting, after decrypting the cipher information by the portable media system, from the portable media system to the host computer system, the clear information when the attribute indicates that the clear information is to be transmitted to the host computer system; and
transmitting the cipher information, previously encrypted by the portable media system, from the portable media system to the host computer system when the attribute indicates that the cipher information is to be transmitted.

17. The machine-readable storage medium as recited in claim 16, wherein the machine further performs operations comprising:
  decrypting the cipher information, stored in the portable media system, with the encryption key before transmittal of the clear information from the portable media system to the host computer system.

18. The machine-readable storage medium as recited in claim 16, wherein the command is part of an enhanced command set for exchanging information between the portable media system and the host computer system, wherein the command permits exchanging the cipher information and the clear information between the portable media system and the host computer system, wherein the enhanced command set includes a first command for a Small Computer System Interface (SCSI) read, the first command including the attribute indicating the selection of the clear information or the cipher information, wherein the enhanced command set includes a second command for a SCSI write, the second command including another attribute indicating whether encryption is to be performed on data being written to the portable media system.

19. The method as recited in claim 1, further comprising:
  receiving the cipher information back from the host computer system after transmitting the cipher information from the portable media system to the host computer system;
  decrypting the cipher information, received from the host computer system, with the encryption key, stored inside of the portable media system, to obtain the clear information; and
  transmitting, from the portable media system to the host computer system, the clear information after the decrypting.

* * * * *